(12) United States Patent
Kasuga et al.

(10) Patent No.: US 7,518,761 B2
(45) Date of Patent: Apr. 14, 2009

(54) IMAGE SCANNING APPARATUS

(75) Inventors: Hiroaki Kasuga, Matsumoto (JP);
Atsuyuki Imaizumi, Shiojiri (JP)

(73) Assignee: Seiko Epson Corporation (JP)

( * ) Notice: Subject to any disclaimer, the term of this patent is extended or adjusted under 35 U.S.C. 154(b) by 1019 days.

(21) Appl. No.: 10/925,256

(22) Filed: Aug. 23, 2004

(65) Prior Publication Data
US 2005/0057783 A1 Mar. 17, 2005

(30) Foreign Application Priority Data
Aug. 21, 2003 (JP) ............... 2003-297659

(51) Int. Cl.
H04N 1/46 (2006.01)
H04N 1/04 (2006.01)
(52) U.S. Cl. ............... 358/474; 358/482; 358/514; 358/529
(58) Field of Classification Search ........... 358/505, 358/504, 513, 514, 515, 517, 518, 529, 482, 358/474, 483
See application file for complete search history.

(56) References Cited

U.S. PATENT DOCUMENTS

| | | | | |
|---|---|---|---|---|
| 5,153,924 A | * | 10/1992 | Van Tyne, Sr. ............... | 382/270 |
| 5,592,222 A | * | 1/1997 | Nakamura et al. ........... | 348/294 |
| 6,332,359 B1 | * | 12/2001 | Ueyanagi et al. ........... | 73/514.33 |
| 6,512,221 B2 | * | 1/2003 | Yen et al. .................. | 250/208.1 |
| 6,831,761 B2 | | 12/2004 | Cardot et al. | |
| 2002/0131250 A1 | * | 9/2002 | Yen et al. ................... | 361/760 |
| 2003/0116816 A1 | * | 6/2003 | Kuroda et al. ............... | 257/443 |
| 2003/0117676 A1 | | 6/2003 | Nakamura et al. | |
| 2004/0047006 A1 | | 3/2004 | Kato | |
| 2005/0237401 A1 | * | 10/2005 | Tan et al. ................... | 348/255 |

FOREIGN PATENT DOCUMENTS

| | | |
|---|---|---|
| JP | 63-004760 | 1/1988 |
| JP | 3-191653 | 8/1991 |
| JP | 06-326840 | 11/1994 |
| JP | 7-203154 | 8/1995 |
| JP | 09214700 | * 8/1997 |
| JP | 11-168625 | 6/1999 |
| JP | 284801 | 10/1999 |
| JP | P2002-359728 A | 12/2002 |
| JP | 2003-109057 | 4/2003 |
| JP | 2003-163845 | 6/2003 |
| JP | P2004-40146 A | 2/2004 |

* cited by examiner

*Primary Examiner*—Jerome Grant, II
(74) *Attorney, Agent, or Firm*—Baker Hostetler, LLP

(57) ABSTRACT

An image scanning apparatus comprising a plurality of image scanning sensors 21, 31, 41, and a CIS control chip 50 for controlling these image scanning sensors 21, 31, 41. The CIS control chip 50 has a trigger generator 54 for controlling operation of the image scanning sensors 21, 31, 41, a lamp control circuit 55, and a motor control circuit 56. The CIS control chip 50 also has an AFE 51 having a plurality of input terminals 51*a* to 51*c* for receiving the analog image signals from the first scanning sensor 21, second scanning sensor 31, and third scanning sensor 41, respectively and a gain/offset control circuit for adjusting the gain and offset of each line of analog data supplied from the image scanning sensors 21, 31, 41.

10 Claims, 5 Drawing Sheets

IMAGE SCANNING APPARATUS

BACKGROUND OF THE INVENTION

1. Field of Technology

The present invention relates to an image scanning apparatus having a plurality of image scanning sensors.

2. Description of Related Art

Image scanners are commonly used to scan image data printed on the surface of paper, cards, and other source media. Such image scanners emit light from an LED or other light source disposed in the scan head in the direction of the medium to be scanned while the medium being scanned is held against the scan head. An image scanning sensor disposed in the scan head then detects the light reflected back from the scanned medium to take an image of the scanned medium.

There are two basic types of image scanning sensors, flatbed and sheetfed. With a flatbed scanner, the medium to be scanned remains stationary while the scan head travels relative to the medium for taking an image of the scanned medium. With sheetfed scanners, the scan head remains stationary while the medium being scanned is both held in contact against the scan head and moved relative thereto for taking an image of the scanned medium.

Flatbed scanners are necessarily large because space sufficient for the scan head to traverse the entire surface of the scanned medium must be provided for inside the scanner. Scanner size can therefore be reduced more easily with a sheetfed type of scanner than a flatbed scanner.

FIG. 5 is a side section view of a conventional sheetfed image scanner 300. Original sheets P placed on a supply tray 302 are raised by a raising/lowering tray 303, picked up by the supply roller 304, and conveyed from the insertion slot F into the sheetfed image scanner 300. The sheet P is then transported by the separation roller pair 305 and feed roller pair 306 to the image sensor 301, and the original is imaged by the image sensor 301. When scanning is completed, the imaged sheet P is discharged by exit roller pair 307 from the exit opening R to the exit tray 308. A conventional sheet fed image scanner is disclosed, for example, in Japanese Unexamined Patent Appl. Pub. H11-284801.

A contact image sensor ("CIS") is typically used in sheetfed scanners. CIS sensors scan the medium using a plurality of photodetectors arranged widthwise of the scanned medium through a lens called a rod lens array. Unlike optical reduction image scanners (CCD scanners), CIS image sensors do not require a mirror. Sensor size can therefore be reduced, and the overall scanner size can also be reduced.

In order to image the scanned medium with high precision in a CIS type image scanner, the scanned medium must be pressed to and conveyed over the document glass of the image scanning sensor using e.g., springs or pressure rollers and moving means such as transportation rollers under the control of a motor. In order to scan media having different thicknesses, such as checks and driver licenses, using a single image scanning sensor, the medium must be pressed to the document glass of the image scanning sensor with pressure appropriate to the thickness of the medium. The need to apply an appropriate pressure commensurate with the thickness of the medium complicates the construction of the scanning apparatus.

One way to solve this problem is to provide a plurality of different image scanning sensors with one or more selected according to the thickness of the media to be scanned. However, providing a plurality of image scanning sensors in a single device necessitates the use of a different signal processing circuit, control circuit, and other peripheral elements for each selection of a different image scanning sensor. This increases the cost and the size of the control circuit board.

The image scanning apparatus of the present invention employs a plurality of image scanning sensors in a construction which does not require a different signal processing circuit, control circuit, and other peripheral elements etc. such that the scanner cost and size is minimized.

SUMMARY OF THE INVENTION

The image scanning apparatus of the present invention includes a plurality of image scanning sensors for scanning an image of a medium and for generating in response thereto analog image signals, and an IC chip for controlling the plurality of image scanning sensors with the IC chip comprising a control circuit for controlling the scanning operations of the plural image scanning sensors; and a gain/offset adjustment circuit having a plurality of input terminals corresponding to the plural image scanning sensors for adjusting the gain and offset of the analog image signals generated from the plural image scanning sensors.

In accordance with the preferred embodiment of the present invention the gain/offset adjustment circuit is a color gain/offset adjustment circuit having input terminals for three colors preferably red, green, and blue.

It is also preferred for the IC chip to include a trigger signal generator for sending a trigger signal to the plural image scanning sensors to run the corresponding scanning operation.

In the preferred embodiment the plural image scanning sensors are disposed to different transportation paths for scanning different scanned media.

Moreover, the plural image scanning sensors should preferably include a check and/or slip image scanning sensor disposed to a check and/or slip transportation path, and a card image scanning sensor disposed to a card transportation path.

The plural image scanning sensors in the image scanning apparatus of the present invention are preferably contact image sensors.

The present invention also enables the use of a single scanner IC chip preferably a CIS chip comprising an IC control circuit to control the operation of and signal processing of a plurality of image scanners disposed in a single image scanning apparatus representing a single system. Multiple image scanning sensors can thus be used in a single system without the need for a different signal processing circuit, control circuit, and other peripheral elements for each image scanner. This permits the construction of a compact control circuit board.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of an image scanning apparatus according to the present invention is hereafter described in detail below with reference to the accompanying figures.

Figure 1:
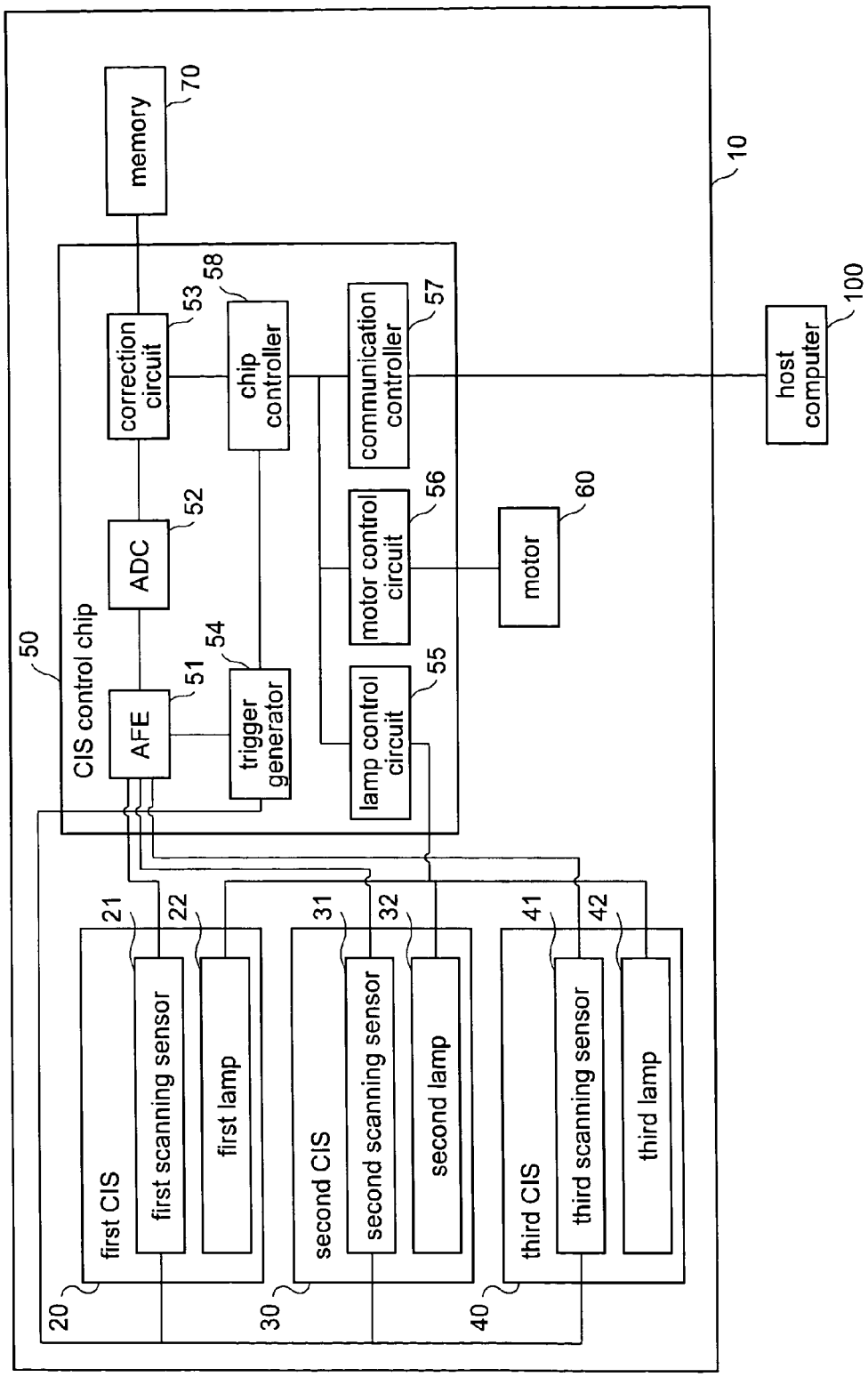
FIG. 1 is a block diagram showing a preferred embodiment of an image scanning apparatus according to the present invention.

One embodiment of the image scanning apparatus 10 of this invention is shown in FIG. 1 comprising a first CIS 20, a second CIS 30, a third CIS 40, a CIS control chip 50, a motor 60, and a memory 70 which operate under the control of a host computer 100 preferably located external of the image scanning apparatus 10. The CIS control chip 50 controls the first CIS 20, the second CIS 30, and the third CIS 40 i.e., the first CIS 20, the second CIS 30, and the third CIS 40 are controlled from the same control system using only one control chip.

The three contact image scanners 20, 30, and 40 are hereafter described in detail.

The first CIS 20 has a first lamp 22 for illuminating a first medium (hereafter "first scanned medium"), and a first scanning sensor 21. The first scanning sensor 21 scans the first scanned medium illuminated by the first lamp 22 to sequentially acquire a first line of analog data Al, which is the image data corresponding to one line of the first scanned medium.

The second CIS 30 has the same configuration as the first CIS 20. That is, the second CIS 30 has a second lamp 32 for illuminating a second medium (hereafter "second scanned medium"), and a second scanning sensor 31. The second scanning sensor 31 scans the second scanned medium illuminated by the second lamp 32 to sequentially acquire a second line of analog data $A_2$, which is the image data corresponding to one line of the second scanned medium.

The third CIS 40 also has the same configuration as the first CIS 20 and second CIS 30. That is, the third CIS 40 has a third lamp 42 for illuminating a third medium (hereafter "third scanned medium"), and a third scanning sensor 41. The third scanning sensor 41 scans the third scanned medium illuminated by the third lamp 42 to sequentially acquire a third line of analog data $A_3$, which is the image data corresponding to one line of the third scanned medium.

The first CIS 20, second CIS 30, and third CIS 40 each scan the corresponding first second and third scanned medium one line at a time as the motor 60 drives transportation rollers (not shown) to advance each scanned medium one line at a time. Each line of analog data $A_1$, $A_2$, and $A_3$ respectively is sent to the CIS control chip 50.

Although the first CIS 20, second CIS 30, and third CIS 40 are herein described with each arranged along a different transportation path for scanning different media, it is to be understood that the invention is not limited to this arrangement. For example, as an alternative, two CIS units could be disposed to the same transportation path while switching to the appropriate CIS unit according to the thickness of the scanned medium. As an even further alternative, two CIS units could be disposed on opposite sides of the same transportation path to image the front and back sides of the scanned medium.

The CIS control chip 50 is an IC chip for controlling the CIS scanning operation. More specifically, the CIS control chip 50 controls the medium to be scanned by either the first CIS 20, second CIS 30, or third CIS 40 respectively and converts the first line of analog data $A_1$, second line of analog data $A_2$, and third line of analog data $A_3$ outputted from the first CIS 20, second CIS 30, and third CIS 40, respectively, into digital signals, and then writes the digital signals to memory 70. The CIS control chip 50 comprises an AFE (analog front end) 51, an ADC (analog to digital converter) 52, a correction circuit 53, a trigger generator 54, a lamp control circuit 55, a motor control circuit 56, a communication controller 57, and a chip controller 58 for controlling the operation of the circuit components 51 to 57 respectively so that the scanned medium is moved or advanced one line at a time in a given sequence.

The CIS control chip 50 preferably has three input terminals, and is effectively equivalent to a color CIS control chip for the three colors red, green, and blue (RGB). A color CIS control chip can therefore be used as the CIS control chip 50 in this invention.

Figure 2:
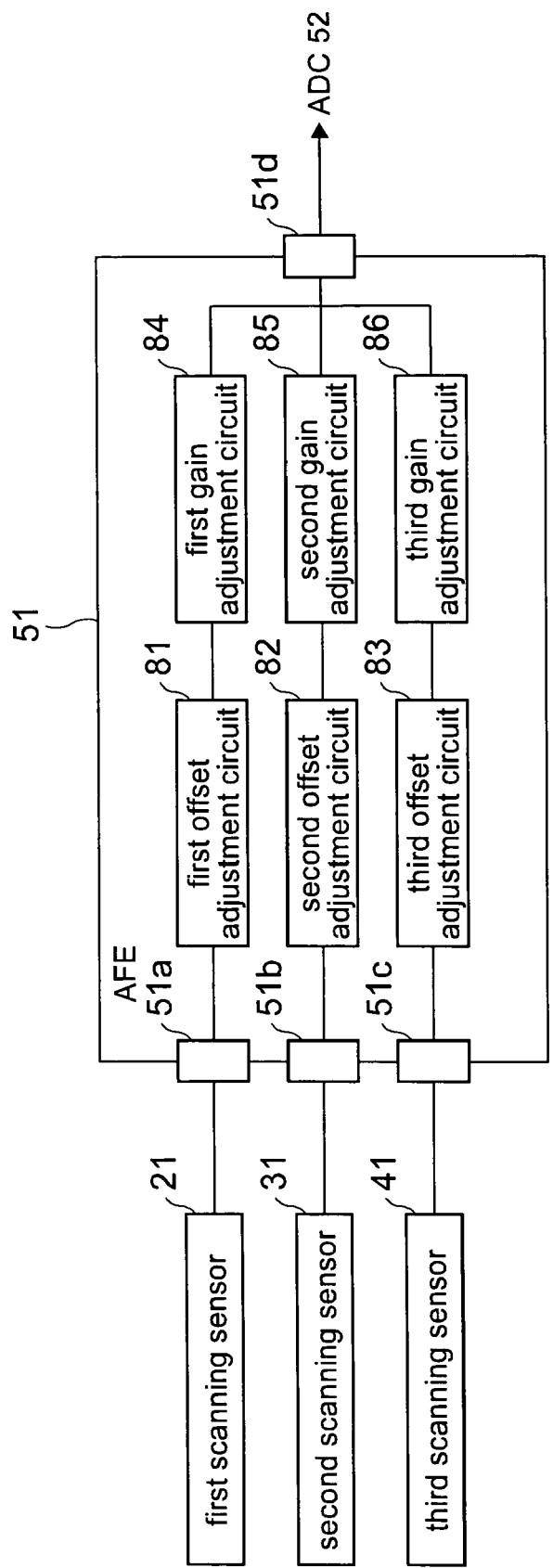
FIG. 2 shows part of the control circuit of an image scanning apparatus according to the present invention.

The AFE 51 is a gain/offset adjustment circuit for adjusting the offset voltage and gain of the first line of analog data $A_1$ from the first CIS 20, second line of analog data $A_2$ from the second CIS 30, and the third line of analog data $A_3$ from the third CIS 40 supplied to the downstream analog to digital converter ADC 52. As shown in FIG. 2, the AFE 51 has three input terminals 51a, 51b, 51c corresponding to the three analog input signals, that is, to the first line of analog data $A_1$, the second line of analog data $A_2$, and the third line of analog data $A_3$ respectively.

More specifically, the AFE 51 has a first offset adjustment circuit 81, second offset adjustment circuit 82, and third offset adjustment circuit 83 for adjusting different offset values according to the characteristics of the first analog line data $A_1$, second analog line data $A_2$, and third analog line data $A_3$, and a first gain adjustment circuit 84, second gain adjustment circuit 85, and third gain adjustment circuit 86 for setting different gain levels for each of the corresponding line data inputs.

The first line of analog data $A_1$ inputted from the first input terminal 51a is adjusted by the first offset adjustment circuit 81 with, the gain adjusted by the first gain adjustment circuit 84 to provide an output offset adjusted signal at the output terminal 51d of the AFE 51 which is then applied to the ADC 52.

The second line of analog data $A_2$ inputted from the second input terminal 51b is adjusted by the second offset adjustment circuit 82, with the gain adjusted by the second gain adjustment circuit 85, to provide an output offset adjusted signal at the output terminal 51d of the AFE 51 which is then applied to the ADC 52.

Likewise, the offset of the third line of analog data $A_3$ inputted from the third input terminal 51c is adjusted by the third offset adjustment circuit 83, with the gain adjusted by the third gain adjustment circuit 86, to provide an output offset adjusted signal at the output terminal 51d of the AFE 51 which is then applied to the ADC 52.

The AFE 51 thus optimizes the signal level and range of each line of analog data $A_1$, $A_2$ and $A_3$, which differ according to the scanning characteristics of the first scanning sensor 21, second scanning sensor 31, and third scanning sensor 41 respectively before each line of analog data is applied to the ADC 52 so that the characteristics of each line of analog data is optimized before being applied to the ADC 52.

The ADC 52 is an A/D converter for converting the first line of analog data $A_1$, the second line of analog data $A_2$, and the third line of analog data $A_3$ outputted from the AFE 51 into corresponding digital signals. The ADC 52 then outputs the digital signals to the correction circuit 53.

The correction circuit 53 digitally processes the digital signals from the ADC 52 as needed. The digitally processed signals from the correction circuit 53 are then sequentially stored to memory 70. A two-dimensional digital image is thus produced in memory 70 by sequentially storing the digital signals from the first CIS 20, second CIS 30, and third CIS 40 to memory 70.

The trigger generator 54 generates a trigger pulse as controlled by the chip controller 58 to tell the first CIS 20, second CIS 30, and third CIS 40 to image one line of data. The first CIS 20, second CIS 30, and third CIS 40 thus images one line of data according to the timing of the trigger pulse generated by the trigger generator 54.

The lamp control circuit 55 is a control circuit for driving the first lamp 22, second lamp 32, and third lamp 42 in the first to third CIS sensors 20, 30, and 40 respectively. The first lamp 22, second lamp 32, and third lamp 42 addressed by the lamp control circuit 55 then illuminates the scanned medium located in the corresponding transportation path, and thus enables the corresponding scanning sensor 21, 31, 41 to image the medium.

The motor control circuit 56 controls driving the motor 60 to convey the medium through the transportation path for scanning. The motor 60 is a stepping motor enabling the output shaft of the motor to be controlled in steps. The motor control circuit 56 sends a specific pulse to the motor 60 to control rotation of the motor 60, or more specifically to control rotation of the transportation rollers driven by the motor 60, and thereby control the distance the scanned medium is conveyed in the transportation path.

The communication controller 57 is a control unit for controlling communication with an external device such as host computer 100. The communication controller 57 calls operations such as transporting, discharging, and imaging the scanned medium when specific commands are received from the host computer 100.

When a scan command is received from the host computer 100 through the communication controller 57 in an image scanning apparatus 10 according to this embodiment of the invention, the chip controller 58 determines from the received scan command whether to drive the first CIS 20, second CIS 30, or third CIS 40 for scanning. While transporting the scanned medium by means of the motor control circuit 56, the chip controller 58 drives the lamp control circuit 55 to illuminate the medium travelling through the transportation path, and drives the trigger generator 54 to output a trigger pulse to the selected image scanner so that the selected image scanner images the medium.

The resulting analog line data is then sent to the AFE 51, which adjusts the offset and gain according to the image scanner being used. The ADC 52 then converts the adjusted signal into a digital signal. The resulting digital signal is then digitally processed by the correction circuit 53, and the digital signal for the one line of scanned data is stored in the memory 70. It should clearly be understood that the AFE of this invention may be used not only for CIS type image scanners but also for CCD.

This process repeats for the number of lines in the scanning area of the medium, gradually building a two-dimensional image of the scanned medium in memory 70.

As described above, an image scanning apparatus 10 according to this embodiment of the invention has a first scanning sensor 21 for imaging a first scanned medium and for generating a first line of analog data $A_1$, a second scanning sensor 31 for imaging a second scanned medium and for generating a second line of analog data $A_2$, a third scanning sensor 41 for imaging a third scanned medium and for generating a third line of analog data $A_3$, and a CIS control chip 50 for controlling the first scanning sensor 21, second scanning sensor 31, and third scanning sensor 41 respectively.

The CIS control chip 50 includes a trigger generator 54, lamp control circuit 55, and motor control circuit 56 for controlling the scanning operations of the first scanning sensor 21, second scanning sensor 31, and third scanning sensor 41. The CIS control chip 50 also has a plurality of input terminals 51a to 51c corresponding to the first scanning sensor 21, second scanning sensor 31, and third scanning sensor 41, and an AFE 51, that is, an offset/gain adjustment circuit for adjusting the offset and gain of the analog data $A_1, A_2, A_3$ generated from the first scanning sensor 21, second scanning sensor 31, and third scanning sensor 41 respectively.

This invention thus controls the operation and signal processing of three image scanning sensors, specifically, first scanning sensor 21, second scanning sensor 31, and third scanning sensor 41, using a single CIS control chip 50. A separate signal processing circuit and/or control circuit for each image scanning sensor is therefore unnecessary even when using multiple image scanning sensors, and the size of the control circuit board can be minimized.

The one CIS control chip 50 of the foregoing embodiment is described as having an AFE (analog front end) 51, ADC (analog to digital converter) 52, correction circuit 53, trigger generator 54, lamp control circuit 55, motor control circuit 56, communication controller 57, and chip controller 58. It should be understood however that the invention is not to be construed as limited to use of a single control chip having all of the above identified circuit components. Instead for example, the AFE (analog front end) 51, ADC (analog to digital converter) 52, and correction circuit 53 could be disposed in one control chip for processing data from the respective image scanning sensors 21, 31, 41, while the trigger generator 54, lamp control circuit 55, motor control circuit 56, and communication controller 57 could be disposed in a separate control chip for controlling the scanning operations of the first CIS 20, second CIS 30, and third CIS 40 respectively. It is thus sufficient to operate the contact image sensors including the first CIS 20, second CIS 30, and third CIS 40 controlled using one control chip and another separate control chip for other different functions. Nevertheless, it is still preferred to use only one circuit board incorporating all of the separate control chips even though each control chip is used for different functions.

As noted above, a control IC for a color scanner can be used as the CIS control chip 50 of the present embodiment. In this case the first scanning sensor 21, second scanning sensor 31, and third scanning sensor 41 are connected to the RGB inputs, respectively, of the color scanner, and the control program is written to firmware. A complicated control system is therefore unnecessary, and the control circuit board which includes the control IC can be compactly rendered.

In practical application, existing software resources can be used by using a color scanner controller IC as the CIS control chip 50. Writing a special control program for an CIS control chip 50 used to control multiple image scanning sensors is therefore unnecessary, and firmware development costs can therefore be reduced.

The invention has heretofore been described in connection with connecting three image scanning sensors to the CIS control chip 50, but the invention is obviously not to be construed as limited to this arrangement. For example, two image scanning sensors could be connected to the CIS control chip 50 with one input terminal to the AFE 51 of the CIS control chip 50 simply left unused.

Figure 3:
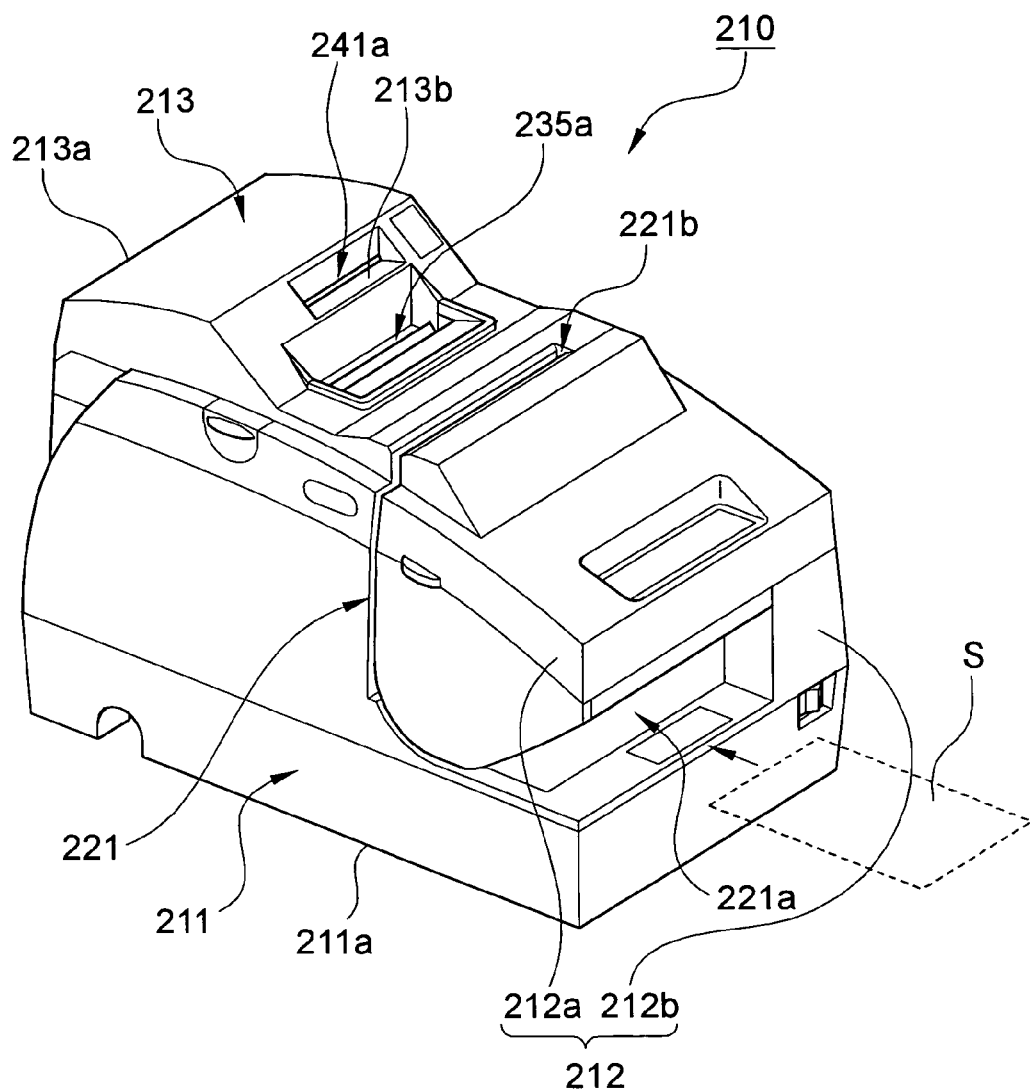
FIG. 3 shows a printer incorporating an image scanning apparatus having two image scanning sensors in accordance with the present invention.
Figure 4:
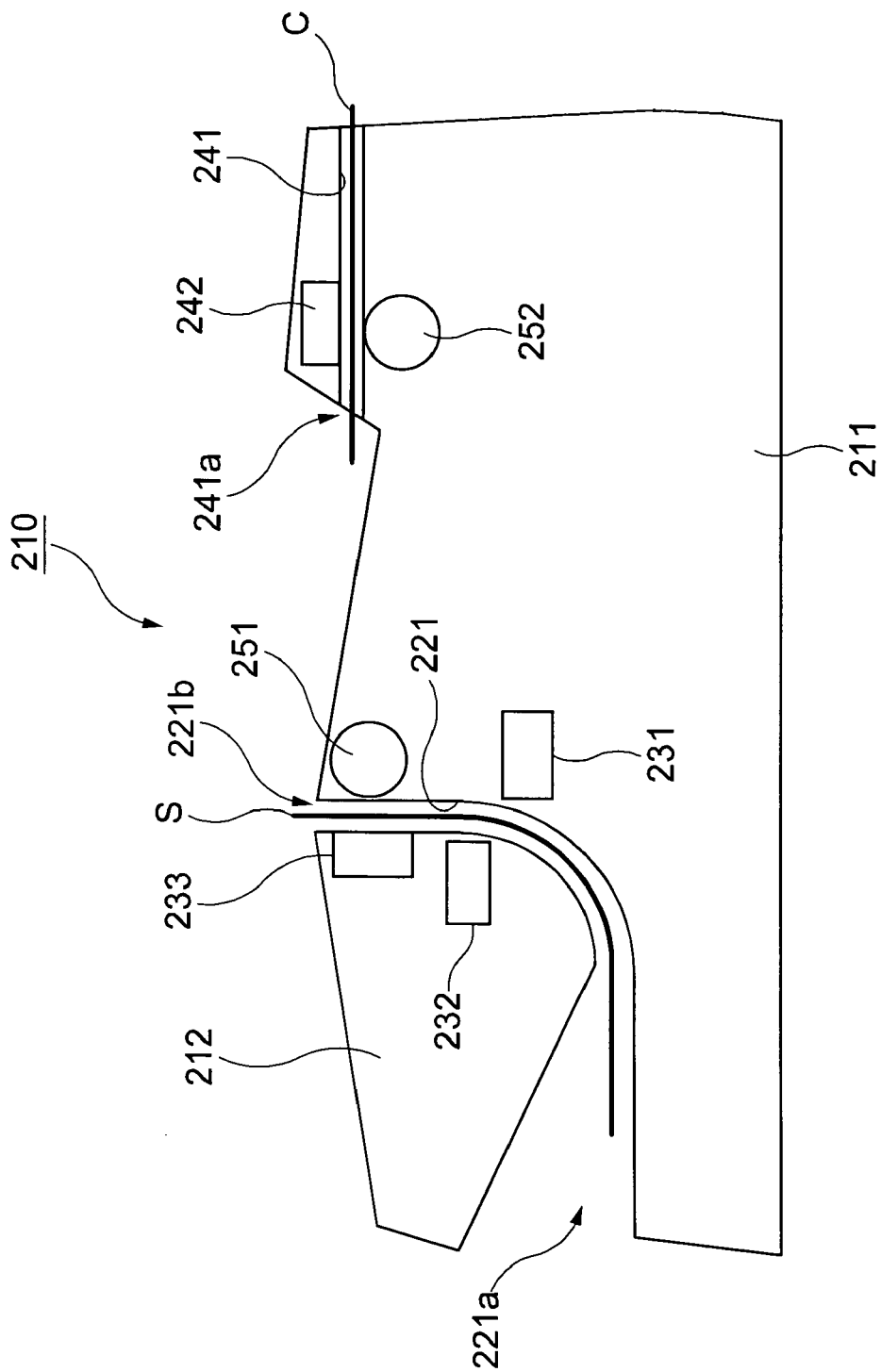
FIG. 4 is a diagrammatic schematic of the printer of FIG. 3 for printing to different mediums.
Figure 5:
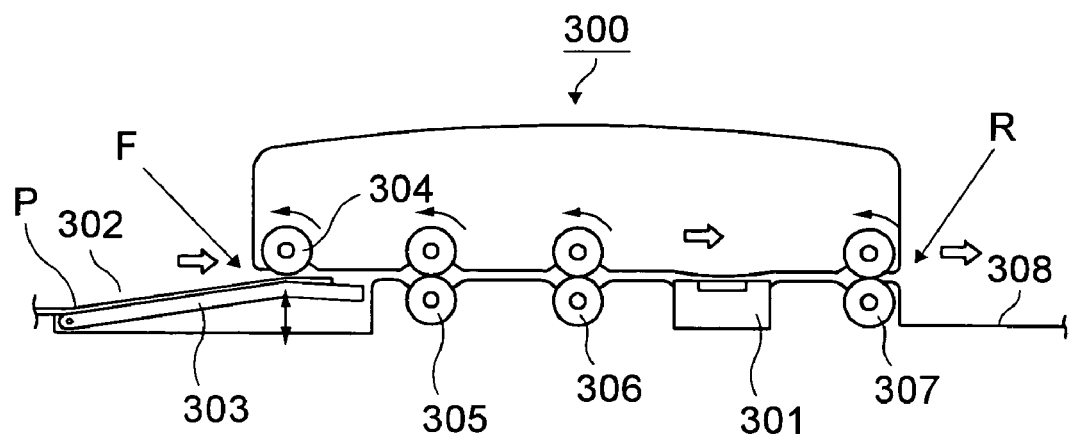
FIG. 5 is a side sectional view of a conventional sheetfed image scanner.

FIG. 3 and FIG. 4 show an implementation of the CIS control chip 50 in a printer 210 having an integral image scanning sensor representing an image scanning apparatus including two image scanning sensors.

The printer 210 as is shown in FIG. 3 has a printing unit for printing to both roll paper and slips S, and has two image scanning sensors for scanning two types of media, specifically slips S and cards C.

This printer 210 has an integrally assembled back case 211, front case 212, and top cover 213. The back case 211 holds the roll paper as a continuous recording medium, and a print mechanism (not shown) for printing to roll paper, inside the body 211a. The front case 212 is rendered in front of the back case 211 forming a slip transportation path 221 through which slips S are conveyed between the front case 212 and back case 211. The top cover 213 is assembled to cover the top of the back case 211, and holds the image scanning sensor for scanning cards C.

The front case 212 has a front side cover 212a separated from the back case 211 with the slip transportation path 221 therebetween, and a front side support portion 212b for supporting the cantilevered front side cover 212a. As shown in FIG. 4, slips S are inserted to the slip transportation path 221 from a slip insertion slot 221a, which is disposed at the front of the printer 210 between the body portion 211a of the back case 211 and the front side cover 212a part of the front case 212. The slip S is then discharged from a slip exit 221b at the top end of the transportation path.

A roll paper exit 235a is also formed between the back case 211 and top cover 213. Roll paper (not shown) stored in the roll paper compartment (not shown) inside the back case 211 is discharged from the roll paper exit 235a.

A card insertion slot 241a is also formed in the top cover 213 for inserting cards C to the transportation path.

As shown in FIG. 4, a slip S inserted from the slip insertion slot 221a to the slip transportation path 221 can be printed by back printing unit 231 and front printing unit 232 rendered along the slip transportation path 221. A slip image scanning sensor 233 for scanning the front of the slip S, and slip pressure roller 251 for pressing the slip S to the slip image scanning sensor 233, are disposed near the slip exit 221b of the slip transportation path 221. The slip image scanning sensor 233 is a CIS device.

A card image scanning sensor 242 for imaging the surface of a card C conveyed from the card insertion slot 241a through the card transportation path 241, and a card pressure roller 252 for pressing the card C to the card image scanning sensor 242, are disposed along the card transportation path 241. Like the slip image scanning sensor 233, the card image scanning sensor 242 is also a CIS device.

A CIS control chip 50 such as is shown in FIG. 1 can be included in a printer 210 as shown in FIG. 3 and FIG. 4. The CIS control chip 50 can be included in printer 210 by substituting the slip image scanning sensor 233 for the first CIS 20, substituting the card image scanning sensor 242 for the second CIS 30, and omitting the third CIS 40.

The printer 210 may be used to scan a check and a type of slip S, using the slip image scanning sensor 233 and using the card image scanning sensor 242 to scan a driver license or other identification card presented by the check user. Accordingly, such a printer 210 can thus easily generate check verification data by both scanning the check and scanning the driver license or other identification verifying the identity of the check user.

Furthermore, the printer 210 can also control the operation and signal processing of two image scanning sensors, slip image scanning sensor 233 and card image scanning sensor 242, using a single CIS control chip 50. Providing a separate signal processing circuit and control circuit for each image scanning sensor is therefore unnecessary even when using multiple image scanning sensors, thus affording a compact control circuit board.

A color scanner controller IC can be used as the CIS control chip 50 for use in the printer 210. The control program (firmware) can be easily configured in this case by assigning the RGB color scanner input terminals to the slip image scanning sensor 233 and the card image scanning sensor 242, and leaving the third input terminal unused. A complicated control system is therefore unnecessary, and the control circuit board can be compactly rendered.

In practical application, existing software resources can be used by using a color scanner controller IC as the CIS control chip 50. Producing a special control program for an CIS control chip 50 used to control multiple image scanning sensors is therefore unnecessary, and firmware development costs can therefore be reduced.

The slips S described above are any individual slip form. The slips S could therefore be personal or business checks, and the scanners could be configured to image both sides of each check.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image scanning apparatus comprising a plurality of image scanning sensors having at least one analog front end connected to said image scanning sensors for scanning an image from a medium and for generating output analog image data signals from each of the image scanning sensors respectively and an IC chip for controlling the output analog image data signals generated from each of said plurality of image scanning sensors, wherein:
   the IC chip comprises a control circuit for controlling scanning operations of the plurality of image scanning sensors; and
   a gain/offset adjustment circuit having a plurality of input terminals for receiving the output analog image data signals from said plurality of image scanning sensors, and for adjusting the gain and offset of each of the analog image data signals generated by said plurality of image scanning sensors.

2. The image scanning apparatus as described in claim 1, wherein the gain/offset adjustment circuit is a color gain/offset adjustment circuit having three input terminals corresponding to each of the three colors red, green, and blue.

3. The image scanning apparatus as described in claim 1, wherein the IC chip further comprises a trigger signal generating portion for generating a trigger signal to control the operation of each of said plurality of image scanning sensors.

4. The image scanning apparatus as described in claim 1, wherein the plural image scanning sensors are disposed to different transportation paths for scanning different scanned media.

5. The image scanning apparatus as described in claim 4, wherein the plural image scanning sensors comprises a check and/or slip image scanning sensor disposed to a check and/or slip transportation path, and a card image scanning sensor disposed to a card transportation path.

6. The image scanning apparatus as described in claim 1, wherein the plural image scanning sensors are contact image sensors.

7. An image scanning method for controlling a plurality of image scanning sensors using only one analog front end connected to at least two of plurality of image scanning sensors for receiving output analog image data generated from at least two image scanning sensors respectively comprising the steps of:

controlling each of said plurality of scanning sensors to generate said output analog image data with the output image data being generated to correspond to one line of analog data at a time in a given sequence;

adjusting the offset voltage and gain of each line of output analog image data to form an offset adjusted output image signal for each image scanning sensor;

applying the offset adjusted output image signal from each image scanning sensor to an analog digital converter;

storing the digitally converted signals for each line of analog image data into memory and advancing the scanned medium relative to each of said plurality of scanning sensors one line at a time in the same sequence.

8. An image scanning method as defined in claim 7 wherein said control IC chip includes said analog front end having a plurality of input terminals for receiving the output analog image data signals from said plurality of image scanning sensors, and further includes a gain/offset adjustment circuit for adjusting the gain and offset of each of the analog image data signals generated by said plurality of image scanning sensors and a trigger signal generating circuit for generating a trigger signal to control the timing and advancing operation of each of said plurality of image scanning sensors.

9. An analog front end processor used for image scanning apparatus comprising:

first input terminal connected to first image scanning sensor;

second input terminal connected to second image scanning sensor;

first offset/gain controller for controlling first output analog image data signal generated from said first scanning sensor;

second offset/gain controller for controlling second output analog image data signal generated from said second scanning sensor, wherein:

said first image scanning sensor taking not for RED signal but for monochrome signal from a slip/check medium, said second image scanning sensor taking not for GREEN nor BLUE signal but for monochrome signal for a card medium.

10. An image scanning apparatus comprising:

an analog front end processor;

first image scanning sensor connected to said analog front end processor via a first input terminal, second image scanning sensor connected to said analog front end processor via a second input terminal, first offset/gain controller for controlling first output analog image data signal generated from said first scanning sensor, second offset/gain controller for controlling second output analog image data signal generated from said second scanning sensor, wherein:

said first image scanning sensor taking not for RED signal but for monochrome signal from a slip/check medium, said second image scanning sensor taking not for GREEN nor BLUE signal but for monochrome signal for a card medium.

* * * * *